W. E. SEELYE.
DETACHABLE TOOL AND HANDLE.
APPLICATION FILED AUG. 9, 1917.
1,263,131.
Patented Apr. 16, 1918.
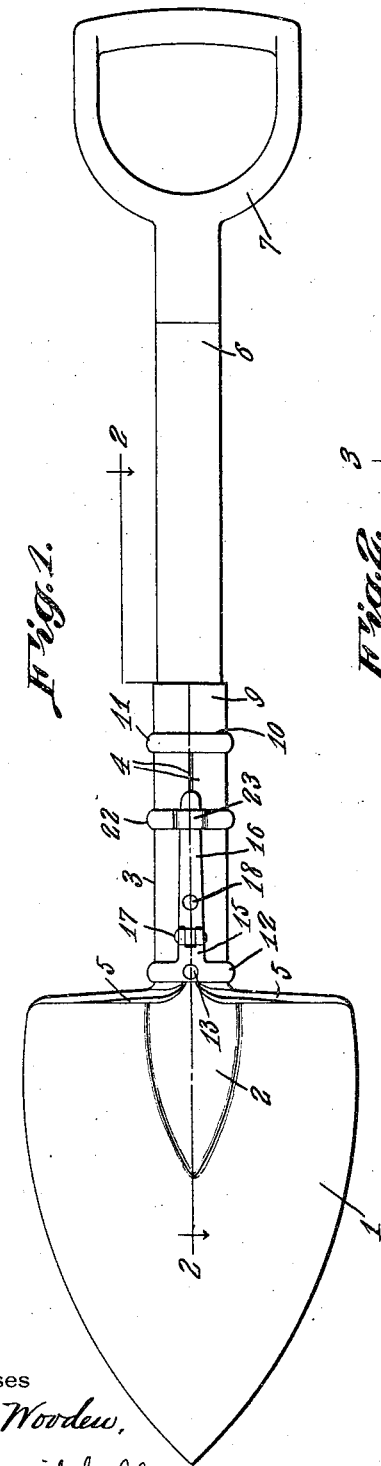
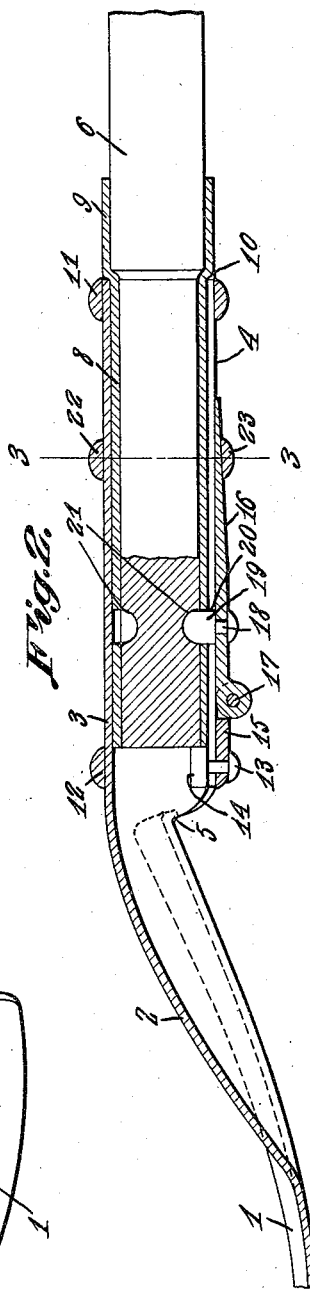
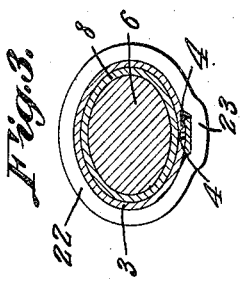
Witnesses
F. B. Wooden,
H. A. Mitchell
W. E. Seelye, Inventor
by C. A. Snow & Co.
Attorneys

UNITED STATES PATENT OFFICE.

WILLIAM E. SEELYE, OF DULUTH, MINNESOTA, ASSIGNOR TO SEELYE TOOL COMPANY, OF DULUTH, MINNESOTA, A CORPORATION OF MINNESOTA.

DETACHABLE TOOL AND HANDLE.

1,263,131.  Specification of Letters Patent.  Patented Apr. 16, 1918.

Application filed August 9, 1917. Serial No. 185,337.

*To all whom it may concern:*

Be it known that I, WILLIAM E. SEELYE, a citizen of the United States, residing at Duluth, in the county of St. Louis and State of Minnesota, have invented a new and useful Detachable Tool and Handle, of which the following is a specification.

The present invention appertains generally to tools such as shovels, spades, and the like, and it is the object of the invention to provide novel and improved means for detachably connecting the blade or implement and the handle member.

The invention has for its object the provision of novel and improved means for securely fastening together a blade and handle member, whereby the device will withstand the various strains imposed thereon and rough usage, and permitting the tool and handle member to be separated for conveniently carrying, storing or transporting the same. The improvements are used to advantage in the shovel or spade for use by miners, prospectors, and the like, and also designed for use in trench digging, sapping and similar military operations, the structure being such that the device is not apt to be broken or injured due to prying and twisting strains, in addition to end thrusts and strains incident to the use of the device for chopping roots and other objects.

A further object of the invention is the provision of a novel slip joint between the handle member and tool providing a firm connection between the parts, yet permitting them to be readily assembled and separated.

A still further object of the invention is the provision of novel means for holding the parts assembled.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a bottom plan view of the device constructed as a shovel for use by miners, prospectors, soldiers, and the like.

Fig. 2 is a longitudinal section on the line 2—2 of Fig. 1, on an enlarged scale.

Fig. 3 is an enlarged cross section on the line 3—3 of Fig. 2.

In the device, as illustrated, the blade 1 is in the form of a shovel blade, although it may be any suitable implement desired. This blade 1 is provided with an upstruck roll 2 and a tubular elongated socket 3 extending longitudinally from said roll and having edge portions bent downwardly toward one another, as at 4, providing a longitudinal slit at the bottom of the socket. This blade and its socket can be readily stamped from sheet metal, the edge portions 4 of the socket merging into the flanges or lips 5 bent from the socket end of the blade 1, thereby providing a thoroughly rigid blade and socket, the roll 2 serving as a brace in addition to the flanges 5, between the blade and socket, to withstand the strains and wear and tear.

The handle member comprises the shank or staff 6 formed of wood or other equivalent material, preferably of elliptical cross section, as seen in Fig. 3, the socket 3 also being of similar cross section. The shank or staff 6 has a suitable handle or hand-hold 7, and an elongated ferrule 8 is fitted on the reduced terminal of the shank opposite to the handle, and is of elliptical contour to slip snugly into the elongated socket 3. The elliptical or non-circular outline of the socket and ferrule prevents them being assembled in any position excepting two reversed positions, thus facilitating the connection of the parts and avoiding confusion. The inner end of the ferrule 8 near the handle 7 has an enlargement 9 fitting on the enlarged portion of the shank 6, and forming a shoulder 10 to abut against the inner end of the socket 3, whereby to take up end thrust, and transmit it from the handle member to the tool, without the liability of the handle member tearing loose in the socket.

In order to inexpensively hold the socket 3 against opening, rings 11 and 12 are shrunk or otherwise fitted upon the socket 3 adjacent to its inner and outer ends, respectively, said rings being of a shape to fit the socket, and prevent the expansion thereof or the separation of the edge portions 4 due to the prying, twisting or similar strains.

A rivet 13 or other securing element is engaged outwardly through the split portion of the socket 3 and bottom of the ring 12, and is provided at its inner end with a head 14 providing a stop against which the outer end of the handle member, including the shank 6 and ferrule 8, abuts, to take up end thrusts in connection with the shoulder 10 bearing against the inner end of the socket.

The means for securing or latching the tool and handle member together includes a stub 15 projecting from the bottom of the ring 12 along the split portion of the socket, and a hinge leaf or latch 16 hinged, as at 17, to the stub 15, and projecting toward the handle 7. The latch 16 is tapered or decreased in thickness from its hinged to its free end, as seen in Fig. 2, and a rivet 18 or other securing element is engaged to the latch 16 near its hinged end and is provided at the inner side of the latch with a latch lug 19 movable through an aperture 20 in the split portion of the socket 3. The shank 6 and ferrule 8 thereon are provided at opposite sides with recesses 21, one of which is adapted to receive the lug 19 in either position of the handle member and tool relatively to one another. A ring 22 is slidable snugly on the socket 3 to slip onto the latch 16 when it is swung against the socket to move the lug 19 into the respective recess 21, thereby holding the latch in place. The bottom portion of the ring 22 is offset, as at 23, to fit over the latch 16, and by forcing the ring 22 toward the tool, the latch 16 will wedge between the socket 3 and offset portion 23 of the ring 22 to firmly hold the parts together. By sliding the ring 22 toward the ring 11 off of the latch 16, the latch can be swung away from the socket to remove the lug 19 from the recess 21, and this permits the handle member and tool to be separated.

Importance is attached to the fact that the shank 6 in fitting within the ferrule 8 which slips into the socket, prevents the shank from expanding within the socket, due to the swelling of the wood by absorption of moisture. In other words, the wood will expand within the ferrule, and the ferrule confines the wood therein, so that the ferrule can readily slip into and out of the socket 3 under adverse conditions. Both ends of the socket 3 are open so that no dirt or trash will accumulate therein. The present device is especially useful to miners, prospectors, trench diggers, sappers, and the like. The handle member and tool can be separated for conveniently carrying or storing the same, and said parts when assembled will withstand rough usage, even when prying or twisting the blade by the handle member, or when using the blade for chopping roots and the like.

Having thus described the invention, what is claimed as new is:

1. A device of the character described embodying a tool having a split socket, a handle member fitted therein, means embracing the socket near its opposite ends to prevent it from opening, and means carried by the socket between said means and engageable with the handle member to hold it therein.

2. A device of the character described embodying a tool having a split socket, a handle member fitted therein, means embracing the socket near its opposite ends to prevent it from opening, and a latch carried by the socket between said means and engageable with the handle member to retain it therein.

3. A device of the character described embodying a tool having a split socket, a handle member to slip into said socket, a latch hingedly connected with the socket to swing thereagainst and having a lug to hold the handle member in the socket, the latch being arranged to overlap the split portion of said socket, and means for holding the latch against the socket.

4. A device of the character described embodying a tool having a split socket, a handle member to slip into said socket, a latch hingedly connected with the socket to swing thereagainst and having a lug to hold the handle member in the socket, the latch being arranged to overlap the split portion of said socket, and a ring slidable on the socket to fit over said latch and hold it against the socket.

5. A device of the character described embodying a tool having a socket, a ring embracing the socket, a handle member to slip into the socket, and a latch hingedly connected with said ring to hold the handle member in the socket.

6. A device of the character described embodying a tool having a socket, a ring embracing the socket, a handle member to slip into the socket, a latch hingedly connected with the ring to swing against the socket and having means to hold the handle therein, and a ring slidable on the socket to move over said latch.

7. A device of the character described embodying a tool having a split socket, a ring embracing the socket, a handle member to slip into the socket, a latch hingedly connected with the ring to overlap the split portion of the socket, and having means to hold the handle member in said socket, and a ring slidable on the socket member to move over said latch.

8. A device of the character described embodying a tool having a split socket, rings embracing the socket near the ends thereof, a handle member to slip into said socket, and means carried by the socket between said rings engageable with the handle member to hold it in the socket.

9. A device of the character described embodying a tool having a split socket, rings embracing this socket near the ends thereof, a handle member to slip into said socket, and a latch hingedly connected to one of said rings and projecting toward the other, said latch decreasing in thickness from its hinged to its free end, the latch having a lug to engage the handle member and hold it in the socket, and a ring slidable on the socket member to move over said latch.

In testimony that I claim the foregoing as my own, I have hereto affixed my signature in the presence of two witnesses.

WILLIAM E. SEELYE.

Witnesses:
  Ivy E. Simpson,
  Philomena A. Rockelli.

Copies of this patent may be obtained for five cents each, by addressing the "Commissioner of Patents, Washington, D. C."